United States Patent [19]
McIsaac

[11] 3,755,961
[45] Sept. 4, 1973

[54] IRRIGATION AND FROST PREVENTATION METHOD AND APPARATUS

[76] Inventor: Donald N. McIsaac, 639 Adelaide Dr., Santa Monica, Calif.

[22] Filed: June 9, 1971

[21] Appl. No.: 151,353

[52] U.S. Cl. .................................................... 47/2
[51] Int. Cl. .......................................... A01g 13/00
[58] Field of Search ........................ 47/2; 239/542; 128/59.5; 137/334

[56] References Cited
UNITED STATES PATENTS

| | | | |
|---|---|---|---|
| 1,758,941 | 5/1930 | Gibson | 47/2 X |
| 3,016,202 | 1/1962 | Zalenski | 239/542 |
| 2,154,002 | 4/1939 | Kerrick | 47/2 |
| 1,846,395 | 2/1932 | Huffaker | 47/2 |
| 2,155,184 | 4/1939 | Fujiusa | 47/2 |
| 3,604,728 | 9/1971 | Symcha | 239/542 X |
| 1,021,691 | 3/1912 | McAdie | 47/2 X |
| 661,898 | 11/1900 | Tucker | 47/2 |
| 2,324,234 | 7/1943 | Peters | 239/542 X |

*Primary Examiner*—Robert E. Pulfrey
*Assistant Examiner*—E. M. Coven
*Attorney*—Gerald Singer

[57] ABSTRACT

A method of and system for protecting plantings such as trees, plants, and the like, against frost damage by conducting a heated liquid into heat transfer relation with thermal radiators located adjacent the base of the plantings to heat the radiators and thereby create convection currents which circulate about the plantings to lower the minimum air temperature which the plantings can withstand without permanent frost damage and raise the air temperature about the plantings by the conjoint action of heating the air and circulating the relatively warm air from the air space above the plantings to the air space about the plantings.

A combined irrigation and frost protection system which is selectively operable in an irrigation mode wherein an irrigation liquid is supplied to the plantings through dispensers, preferably drip dispensers, located adjacent the base of the plantings, and a frost protection mode wherein the irrigation liquid is heated and utilized to heat thermal radiators mounted on the dispensers for creating convection air currents about the plantings. The combined system may also be operable in a fertilizing mode wherein a fertilizing agent is introduced into the irrigation liquid.

11 Claims, 13 Drawing Figures

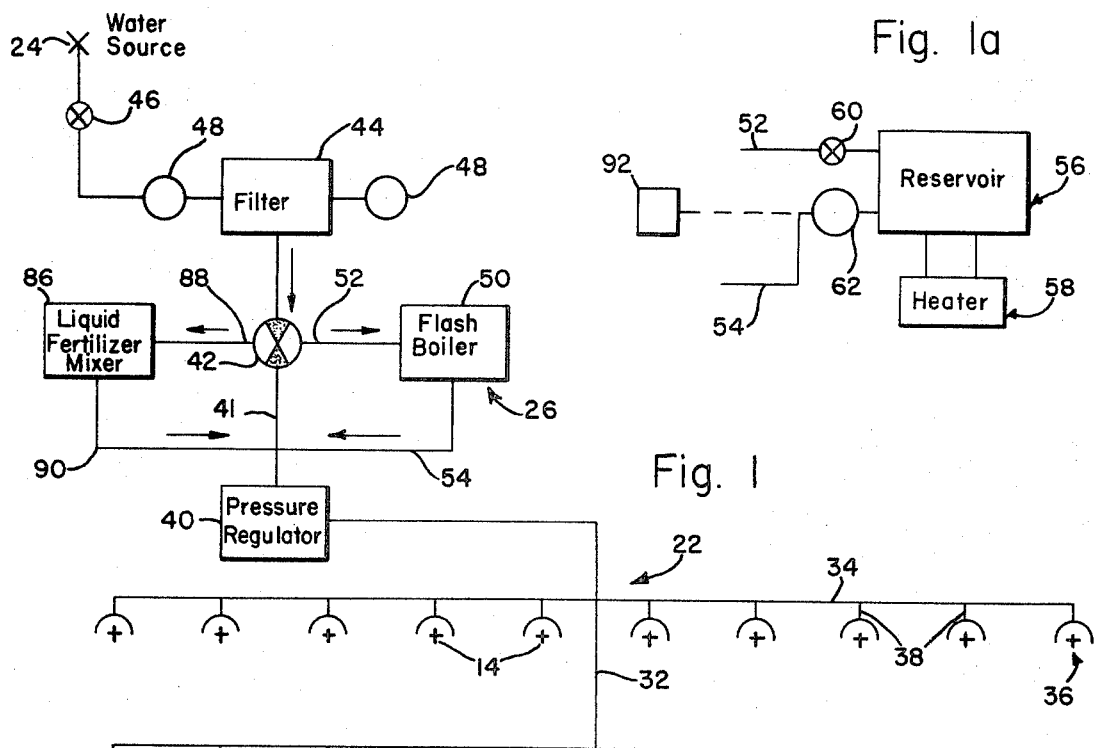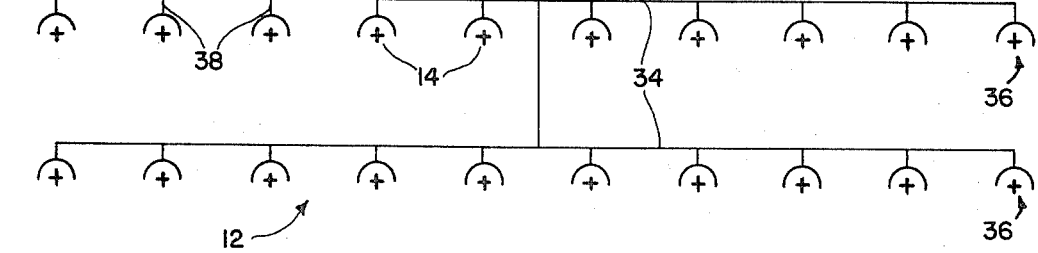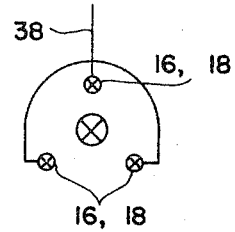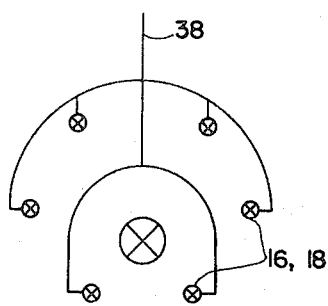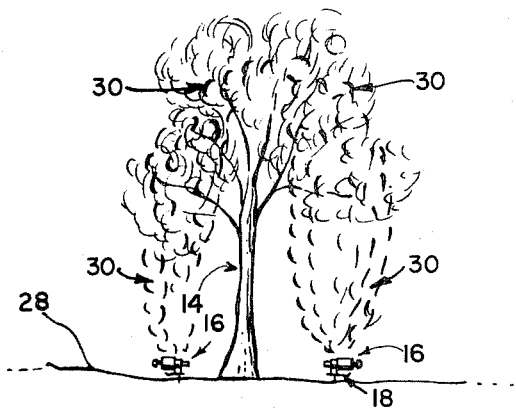
Donald N. McIsaac,
INVENTOR.

PATENTED SEP 4 1973 3,755,961
SHEET 2 OF 2
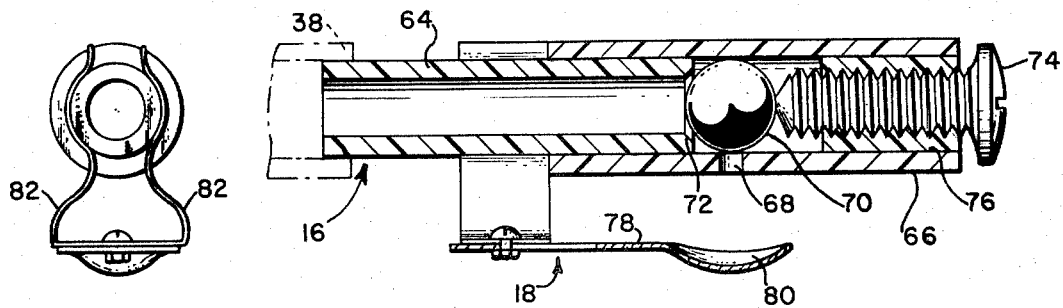
Fig. 5.
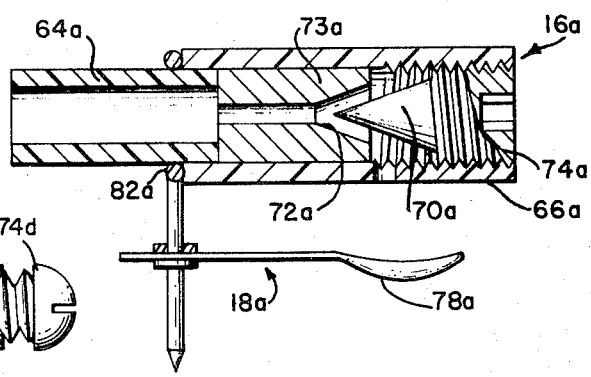
Fig. 6. Fig. 7.
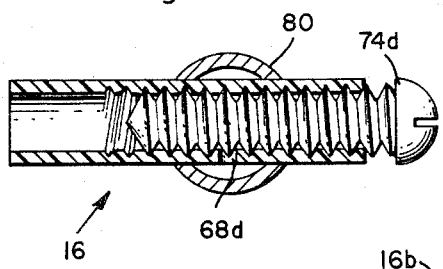
Fig. 10.
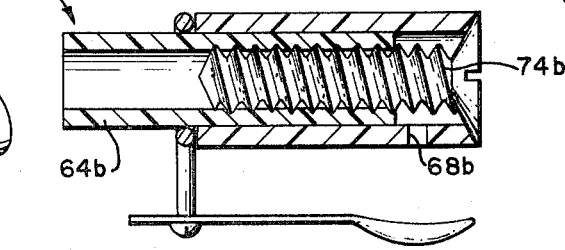
Fig. 8.
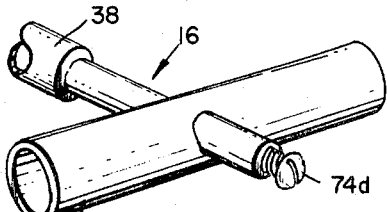
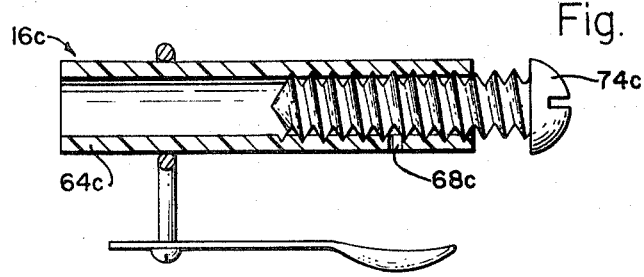
Fig. 12. Fig. 9.
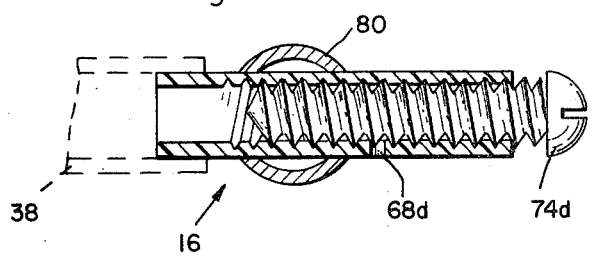
Fig. 11.
Donald N. McIsaac,
INVENTOR.
BY.
AGENT.

IRRIGATION AND FROST PREVENTATION METHOD AND APPARATUS

BACKGROUND OF THE INVENTION

1. Field of the Invention:

This invention relates generally to the horticultural field and more particularly to a novel method of and system for irrigating, fertilizing and/or protecting against frost damage plantings such as trees, plants and the like.

2. Discussion of the Prior Art:

As will become readily apparent from the ensuing description, the present invention may be utilized to irrigate, fertilize and/or protect against frost damage a variety of trees, plants and the like. In this regard, it is important to note at the outset that in the present disclosure, the term "planting" is used in a generic sense to include all types of trees, plants and the like which require irrigation and frost protection. The term "grove" is used in a generic sense to include all arrangements of such plantings which are grown in large numbers for commercial purposes. However, the invention is particularly concerned with and will be described in connection with the irrigation and frost protection of crop-bearing trees, such as fruit trees, nut trees, and the like.

It is well known by those versed in the art to which the present invention pertains that most if not all crop-bearing trees are prone to frost damage when the ambient air temperature drops close to freezing. Moreover, the range between the lowest temperature which such trees can withstand without irreparable or permanent frost damage and the temperature which the trees can withstand without any significant damage is extremely narrow. For example, in the case of certain trees, this temperature range is on the order of 4°. Thus, an ambient air temperature of 28° or lower will cause permanent damage to such trees, while a temperature of 31° or higher will cause no significant damage. At air temperatures within this range, the trees may sustain some degree of frost damage but generally may be saved.

Various methods have been devised to protect large groves of such trees against frost damage. One of these methods involves the use of so-called smudge pots to heat the air and create convection air currents in the tree grove. Another method involves the use of large motor driven fans to induce air circulation in the grove. Such air circulation has the two-fold effect of lowering the minimum air temperature which the trees can withstand without permanent frost damage and raising the air temperature about the trees.

In connection with the two-fold effect of air circulation, it should be noted that while such air circulation is definitely known to lower the minimum air temperature which trees and plants can withstand without permanent damage, the exact reasons for this phenomenon are not understood. On the other hand, the reason why air circulation raises the air temperature is known and is quite simple. Thus, colder air tends to descend and warmer air tends to raise, and air circulation merely circulates the relatively warm air from the air space above the trees to the air space about the trees.

While both the smudge pot and air circulation methods of frost protection are in current widespread use, they suffer from certain serious inherent disadvantages which this invention overcomes. Both systems, for example, are quite costly to install and maintain. Further, the smudge pot method produces air contamination and requires a large number of pots which must be either individually fueled and ignited or provided with a costly central fueling and automatic ignition system. Air circulating fans, on the other hand, are noisy and present periodic servicing, maintenance, and repair problems.

SUMMARY OF THE INVENTION

One important aspect of the present invention is concerned with a novel method of and system for inducing air circulation in a grove of crop-bearing trees or other plantings to protect them against frost damage without the above noted and other disadvantages of the existing smudge pot and fan systems. According to this inventive aspect, one or more thermal radiators are placed adjacent the base of each planting, and a heated liquid, such as water, is conducted into heat transfer relation with the radiatiors to heat the latter. The heated radiators produce convection air currents about the plantings as well as slight heating of the air. The convection air currents protect the plantings against frost damage by the two-fold action explained earlier in connection with the existing fan systems. Thus, the convection air currents lower the minimum air temperature which the plantings can withstand without permanent frost damage and cause circulation of the relatively warm air from the air space above the plantings to the air space about the plantings.

According to another important aspect of the invention, the frost protection system is combined with an irrigation system of the kind having one or more irrigation liquid dispensers at the base of each planting to provide a combined irrigation and frost protection system. The combined system is equipped with means for selectively heating the irrigation liquid and a thermal radiator on each liquid dispenser. The system is selectively operable in an irrigation mode wherein unheated irrigation liquid is supplied to the dispensers to irrigate the plantings and a frost protection mode wherein the liquid is heated and heats the radiators to create convection air currents.

According to the preferred practice of the invention, the irrigation method employed in this combined irrigation and frost protection system is the so-called drip method which has been used very successfully in arid parts of the world, notably Isreal. The liquid dispensers utilized in this drip irrigation method are drip dispensers which dispense the irrigation liquid at relatively low volume in droplets at the base of each planting. The advantages of this irrigation method are well known and hence need not be elaborated on in this disclosure. Suffice it to say that major advantages of the drip method are less liquid evaporation with the result that water of a higher saline content can be used for irrigation than with other irrigation systems, such as open trench and sprinkler systems, reduced competition between the capillary effects of the soil and planting roots to absorb the irrigation liquid, and elimination of water spots and other deposits on the plantings as occurs with the sprinkler-type irrigation systems, particularly when the liquid contains a fertilizing agent.

The particular combined irrigation and frost protection system described employs the drip irrigation method and drip dispensers. The thermal radiators are thermally conductive plates which are mounted on the dispensers in such a way that the plates may be located in the paths along which the droplets of irrigation liquid drip from the dispensers. Accordingly, when the combined system is operated in its frost protection mode, the liquid droplets drip onto and thereby heat the radiators to create convection air currents about the adjacent plantings. In the irrigation mode of the system, the radiators are retracted to permit the irrigation liquid droplets to fall directly onto the soil. A variety of adjustable drip dispenser configurations for the combined system are disclosed. The disclosed system also has provision for selectively introducing a fertilizing agent into the irrigation liquid.

BRIEF DESCRIPTION OF THE DRAWINGS

FIG. 1 is a diagrammatic illustration of a combined irrigation and frost protection system according to the invention;

FIG. 1A illustrates a modified heating arrangement for the system;

FIGS. 2 and 3 illustrate two different arrangements of the liquid dispensing and thermal radiating units which are placed adjacent the base of the plantings to be irrigated and/or protected against frost damage;

FIG. 4 illustrates the manner in which the present system produces convection air currents about a tree to protect the latter against frost damage;

FIG. 5 is an enlarged longitudinal section through one of the liquid dispensing and thermal radiating units embodied in the system of FIGS. 1–4;

FIG. 6 is an end view of the unit in FIG. 5; and

FIGS. 7–9 are longitudinal sections through modified liquid dispensing and thermal radiating units;

FIGS. 10–12 illustrate three separate embodiments comprising a cylindrical tube having a radial hole and a rotatable screw arrangement for varying the flow rate of liquid through said radial hole.

DESCRIPTION OF THE PREFERRED EMBODIMENT

As noted earlier, the present invention has two primary aspects, one concerned only with protecting plantings against frost damage and the other with both irrigating the plantings and protecting them against frost damage. The particular inventive embodiment illustrated in the drawings is a combined irrigation and frost protection system 10 installed in a grove 12 of plantings 14. In this description, it is assumed that the plantings 14 are crop bearing trees, such as fruit or nut trees. While the illustrated system 10 is intended for use as a combined irrigation and frost protection system for the trees 14, it will become evident as the description proceeds that the system may be used in conjunction with some other tree irrigation system and provide only frost protection.

In general terms, the illustrated system 10 includes at least one liquid dispenser 16 and one thermal radiator 18 (FIG. 4) adjacent the base 20 of each tree 14, means 22 for conducting an irrigation liquid such as water from a supply 24 to each dispenser and into heat transfer relation with each radiator, and means 26 for selectively heating the liquid. The system has two operating modes, namely, an irrigation mode and a frost protection mode. In the irrigation mode, unheated irrigation liquid is supplied to the dispenser 16 which dispense the liquid to the soil 28 at the base 20 of the adjacent trees 14. In the frost protection mode, the heating means 26 is operated to heat the irrigation liquid, and the heated liquid is conducted into heat transfer relation with the thermal radiators 18 to heat the latter.

The heated radiators heat the surrounding air by conduction and radiation to produce convection air currents 30 about the adjacent trees. These convection air currents have the two-fold effect of lowering the minimum air temperature which the trees can withstand without permanent damage and circulating the cold air upwardly from and the warm air downwardly to the base of the trees to raise the air temperature about the trees.

In this latter regard, it will be recalled that the effect of air circulation on the minimum air temperature a tree can withstand is known to exist but not understood, while the effect of air currents on grove temperature is both known to exist and understood. It will be further recalled that the temperature range between the temperature a tree can withstand without damage and the temperature at which a tree will sustain permanent frost damage is extremely small and may be on the order of 4°. Accordingly, only a relatively small change in grove temperature and in the minimum air temperature a tree can withstand may be sufficient to protect the tree against frost damage.

Referring now in more detail to the illustrated irrigation and frost protection system 10, the illustrated irrigation liquid dispensers 16 are drip dispensers which dispense the irrigation liquid to the trees 14 in droplets at relatively low volume. A variety of drip dispensers which may be used are illustrated in FIGS. 5–9 and will be described shortly. One or more of the dispensers 16 may be placed adjacent the base of each tree, depending on its age, size and the amount of water it requires. FIGS. 2 and 3 illustrate two possible arrangements of multiple dispensers about each tree.

The irrigation liquid conducting means 22 comprises a piping system including a main supply pipe 32, header pipes 34 extending from the supply pipe along the tree rows 36, and branch pipes 38 extending from the header pipes to the individual dispensers 16 at the base of the tree 14. The supply pipe 32 is connected to the irrigation liquid supply 24 through a pressure regulator 40, a pipe section 41, a three-way mode selector valve 42 to be referred to presently, a filter 44 and a shut-off valve 46. According to customary practics, a pair of pressure gages 48 are connected to the filter 44 to register the liquid pressures at the inlet and outlet sides of its filter elements and thereby provide a visual indication of the filter efficiency in terms of the pressure drop across the filter. An increase in this pressure drop to a predetermined level indicates that the filter elements are dirty and require cleaning.

In the irrigation mode of the system 10, the shut-off valve 46 is opened and the selector valve 42 is placed in an irrigation position. In this position, the selector valve communicates the outlet of the filter 44 directly to the pressure regulator 40 and liquid supply pipe 32. Unheated irrigation liquid is then supplied to the drip dispensers 16 which dispense the liquid in droplets to the soil 28 at the base of their adjacent trees 14. The trees are thereby irrigated in a highly efficient manner as explained earlier in connection with the existing drip irrigation systems. The advantages of such a drip irrigation system were discussed earlier and need not be repeated here.

The irrigation liquid heating means 26 comprises a heater 50, such as a flash boiler, arranged in parallel with the pipe section 41 between the pressure regulator 40 and selector valve 42. The inlet of this boiler is connected to the selector valve 42 through a pipe 52. The boiler outlet connects to the pipe section 41 through a pipe 54. Selector valve 42 has a frost protection position wherein the valve communicates the outlet of filter 44 to the pressure regulator 40 and supply pipe 32 through the flash boiler 50 and its inlet and outlet pipes 52, 54. When the flash boiler is operated in this selector valve position, then the irrigation liquid is heated and the heated liquid is supplied to the drip dispensers 16. As will be explained presently, the thermal radiators 18 are mounted below the dispensers in such a way that they can be located in the path along which the heated liquid droplets drip from the dispensers. The radiators are thus heated by the irrigation liquid to produce the convection air currents 30, as explained earlier.

In some cases, it may be desirable or necessary to maintain a relatively large supply of heated irrigation liquid in readiness for use. This can be accomplished by connecting the heater pipes 52, 54 to a liquid reservoir 56 (FIG. 1A) equipped with a recirculating liquid heating system 58 similar to a swimming pool heating system for maintaining the liquid in the reservoir at a selected elevated temperature. A float controlled valve 60 or the like is connected in the inlet pipe 52 to maintain the proper liquid level in the reservoir. A pump 62 is connected in the pipe 54 for pumping heated liquid from the reservoir to the drip dispenser 16.

FIGS. 5 and 6 illustrate one of the drip dispensers 16. This dispenser has a body sleeve 64, one end of which is fixed within an end of a branch pipe 38 of the piping system 22. Fitted over and fixed to the other end of the body sleeve 64 is an orifice sleeve 66 containing a small orifice 68. Within the orifice sleeve 66 is a ball valve 70 confronting a beveled valve seat 72 on the end of the body sleeve 64. A screw 74 threaded in a sleeve 76 fixed within the outer end of the orifice sleeve 66 is engageable with the ball to limit the maximum clearance between the ball and its valve seat. From this description of the drip dispenser 16, it is evident that irrigation liquid supplied to the dispenser emerges from the latter through the orifice 68 in the form of droplets whose frequency may be regulated by adjusting the screw 74 to vary the clearance between the ball 70 and valve seat 72.

The thermal radiator 18 comprises a clip having a thermally conductive plate 78 with a dished end 80 and resilient clip arms 82 at its opposite end which snap over the dispenser body sleeve 64. The radiator clip is slidable along the body sleeve 64 between its illustrated operative position and an inoperative position against the end of the branch pipe 38. In operative position, the dished end 80 of the radiator plate 78 is located directly below the dispenser orifices 68 so as to be located in the path along which the irrigation liquid drips from the dispenser. When the liquid is heated in the frost protection mode of the system 10, therefore, the liquid droplets from the dispenser drip onto and heat the radiator plate 78 to produce convection air currents 30 about the adjacent tree 14. The liquid tends to collect in the dished plate end 80 to more effectively heat the plate. In inoperative position, the radiator plate 78 is retracted clear of the liquid droplets from the dispenser 16. The drip dispensers may be mounted at the base of the trees 14, just above ground level, in any convenient manner.

According to the preferred practice of the invention, the drip dispensers 16 and the pipes of the piping system 22 are constructed of a plastic, such as polyvinyl chloride, having a relatively low coefficient of thermal conductivity to minimize heat loss from the heated irrigation liquid.

FIGS. 7–9 illustrate alternative drip dispensers 16a, 16b, 16c for use in the system 10. Dispenser 16a in FIG. 7 has a needle orifice control including a needle valve 74a threaded in the dispenser orifice sleeve 66a and having a valve needle 70a extending through a conical valve seat 72a on a valve seat member 73a within the orifice sleeve 66a. The radiator plate 78a of the dispenser radiator 18a has a sliding ring attachment 82a to the body sleeve, whereby the radiator may be moved between operative and inoperative positions like the radiator 18. Ring 82a may have a spike 84a to be inserted into the ground mounting the dispenser in fixed position.

The drip dispenser 16b of FIG. 8 is similar to the dispenser 16a except that the needle valve orifice control of the latter dispenser is replaced by a simple screw 74b threaded in the body sleeve 64b and having a conical head seating against the end of the orifice sleeve 66b. In this case, the threads of the screw form a tortuous passage through which the irrigation liquid flows to the dispenser orifice 68b. The length of this passage and hence the rate of the droplets from the dispenser are adjustable by adjusting the screw. In the simplified drip dispenser 16c of FIG. 9, the orifice sleeve is omitted, the orifice 68c is formed directly in the body sleeve 64c, and the orifice control screw 74c is threaded in the body sleeve. As in the dispenser 16b, the screw threads form a tortuous passage for the irrigation liquid. The rate of the liquid droplets from the dispenser is regulated by adjusting the screw.

Referring now to FIGS. 10, 11 and 12 there is illustrated another embodiment of the radiator in the form of a thermally conductive metal cylinder 80. The radiator 80 in the preferred embodiment is approximately 2 inches long and has a centrally located hole through which the drip dispenser 16 is inserted. In the frost protection mode as shown in FIG. 10, the drip opening 68d is located inside the metal cylinder 80 so that hot liquid will fall on the pipe from which the heat will be radiated. FIG. 11 illustrates the irrigation mode with the liquid falling on the ground directly from the opening 68.

Returning to FIG. 1, the illustrated irrigation and frost protection system 10 has a liquid fertilizer mixer 86 whose inlet is connected through a pipe 88 to the selector valve 42 and outlet is connected through a pipe 90 to the pipe section 41. Selector valve 42 has a fertilizer position wherein it communicates the outlet of filter 44 to the pressure regulator 40 through mixer 86 and its inlet and outlet pipes 88, 90. In this valve position a liquid fertilizer is mixed with the irrigation liquid for fertilizing the trees 14.

It is now evident that the illustrated irrigation and frost protection system 10 is operable in irrigation, frost protection, and fertilizing modes. In its irrigation modes the system dispenses unheated liquid to the trees 14 through the drip dispensers to irrigate the trees. The thermal radiators on the dispensers are preferably retracted in this mode so that the liquid droplets drip from the dispensers fall directly to the soil 28. In the frost protection mode of the system, the radiators are shifted to their frost protection positions and the flash boiler 50 is activated to heat the irrigation liquid. The produce the convection currents 30 about the trees 14. In the fertilizing mode of the system, the irrigation liquid is directed through a fertilizer mixer 86 to effect fertilizing of the trees.

As noted earlier, while the illustrated system is designed for both tree irrigation and frost protection, the irrigation and fertilizing features of the system may be eliminated to provide a simple thermal frost protection system which is operable only in a frost protection mode. In either case, the system may be thermostatically controlled to automatically activate the system in its frost protection mode when the air temperature drops to a preset temperature level. In FIG. 1A, for example, the pump 62 may be activated by a thermostatic control 92 to supply heated irrigation liquid to the dispensers 16 when the temperature drops.

What is claimed as new in support of Letters Patent is:

1. In a frost prevention system for inducing air circulation about a planting to protect the planting against frost damage, the combination comprising:
   a thermal radiator located above the ground having a substantially large radiating surface area located adjacent the base of said planting, and
   a drip dispenser located above said radiator for dispensing droplets of heated liquid onto said radiator whereby said radiator is heated by said droplets to create convection air currents about said planting.

2. A frost protection system according to claim 1 which includes means for heating said liquid at a central location and conducting the heated liquid in a thermally insulated conduit to said drip dispenser.

3. A frost protection system according to claim 2 including:
   thermostatically controlled means for controlling the heated liquid at said central location in response to ambient air temperature about the planting.

4. A frost protection system according to claim 1 wherein:
   said drip dispenser includes
   means for adjusting the rate at which said liquid is dispensed from the dispenser.

5. In a combined irrigation and frost protection system which dispenses an irrigation liquid to the soil at the base of a planting in a grove to be irrigated, the combination comprising:
   thermal radiators located above the ground to be placed adjacent the base of said planting,
   a drip dispensing means located adjacent the base of said plantings for conducting said liquid into heat transfer relation with said radiators and dispensing the liquid into the soil adjacent the planting, and
   means for selectively heating said liquid at a central location and conducting the heated liquid in a thermally insulated conduit to said thermal radiator, whereby said irrigation system is selectively operated in an irrigation mode where unheated liquid is dispensed to irrigate said plantings and a frost protection mode wherein said liquid is heated to heat said radiators and thereby create convection air currents about said plantings to protect the latter against frost damage.

6. A combined irrigation and frost protection system according to claim 5 wherein:
   each radiator comprises a thermally conductive member, and
   each dispenser dispenses said liquid onto its respective radiator.

7. A combined irrigation and frost protection system according to claim 5 wherein:
   each dispenser is a drip dispenser which dispenses said liquid in droplets.

8. A combined irrigation and frost protection system according to claim 7 including:
   means mounting each radiator on its dispenser for adjustment between a frost protection position wherein the radiator is located in the path along which the liquid droplets drip from the dispenser and an irrigation position wherein the radiator is spaced from said path.

9. A combined irrigation and frost protection system according to claim 5 wherein:
   said dispensing means has an inlet for connection to a supply of said irrigation liquid, a pair of parallel flow paths between said inlet and dispensers, and a mode selector valve for communicating said inlet to said dispensers through either flow path, and
   said heating means comprises a heater in one flow path.

10. The method of protecting a planting against frost damage, which comprises the steps of:
    placing a thermally conductive radiator adjacent the base of said planting, and
    conducting a heated liquid drop by drop into heat transfer relation to said radiator to heat the latter and thereby create convection air currents about said planting.

11. The method of irrigating and protecting a planting against frost damage, which comprises the steps of:
    placing a thermally conductive radiator adjacent the base of said planting, and
    selectively dispensing an irrigation liquid onto the said adjacent base of said planting to irrigate the planting in a first mode and heating said liquid and dispensing the heated liquid by drops onto said radiator to heat the latter and thereby create convection air currents about the planting in a second mode.

* * * * *